US012576789B2

(12) United States Patent
Salter et al.

(10) Patent No.: US 12,576,789 B2
(45) Date of Patent: Mar. 17, 2026

(54) CARGO ORIENTATION AND ALIGNMENT

(71) Applicant: Ford Global Technologies, LLC,
Dearborn, MI (US)

(72) Inventors: Stuart C. Salter, White Lake, MI (US);
Brendan Diamond, Grosse Pointe, MI
(US); David Brian Glickman,
Southfield, MI (US); Eric Scott Levine,
Novi, MI (US); William Wurz, San
Francisco, CA (US); **Matthew B.
Rutman**, Canton, MI (US)

(73) Assignee: Ford Global Technologies, LLC,
Dearborn, MI (US)

( * ) Notice: Subject to any disclaimer, the term of this
patent is extended or adjusted under 35
U.S.C. 154(b) by 348 days.

(21) Appl. No.: 17/886,694

(22) Filed: Aug. 12, 2022

(65) Prior Publication Data

US 2024/0051470 A1      Feb. 15, 2024

(51) Int. Cl.
B60R 9/06          (2006.01)
B60Q 9/00          (2006.01)
(52) U.S. Cl.
CPC . B60R 9/06 (2013.01); B60Q 9/00 (2013.01)
(58) Field of Classification Search
CPC .. B60R 9/06; B60Q 9/00; B62D 33/02; B62D
35/001
See application file for complete search history.

(56) References Cited

U.S. PATENT DOCUMENTS

| | | | | |
|---|---|---|---|---|
| 3,142,396 A | * | 7/1964 | Pauley | B60P 1/38 |
| | | | | 414/812 |
| 4,993,088 A | * | 2/1991 | Chudik | A47C 17/80 |
| | | | | 5/118 |
| 5,599,055 A | * | 2/1997 | Brown | B62D 25/2054 |
| | | | | 410/97 |
| 5,988,722 A | * | 11/1999 | Parri | B60P 1/003 |
| | | | | 224/403 |
| 6,491,331 B1 | * | 12/2002 | Fox | B62D 33/0273 |
| | | | | 224/403 |
| 6,540,123 B1 | | 4/2003 | Kmita et al. | |
| 6,648,569 B2 | * | 11/2003 | Douglass | B60P 7/0892 |
| | | | | 410/46 |
| 7,488,021 B1 | | 2/2009 | Roos et al. | |

(Continued)

FOREIGN PATENT DOCUMENTS

| | | | | |
|---|---|---|---|---|
| JP | 3649745 B2 | * | 5/2005 | B60P 3/40 |
| JP | 2023013872 A | * | 1/2023 | |

(Continued)

OTHER PUBLICATIONS

US 10,947,009 B2, 03/2021, Brunner et al. (withdrawn)
WO-2018129192-A2 English Translation (Year: 2018).*
JP-2023013872-A English Translation (Year: 2023).*

*Primary Examiner* — Michael T. Walsh
(74) *Attorney, Agent, or Firm* — Vichit Chea; Carlson,
Gaskey & Olds, P.C.

(57)          ABSTRACT
An adjustment system includes at least one base plate, at
least one accessory supported by the at least one base plate,
and a controller that receives input from at least one sensor.
The controller determines a position of the at least one
accessory on the at least one base plate and makes a
recommendation to adjust a position of the at least one
accessory within the vehicle cargo area to increase aerody-
namic efficiency.

20 Claims, 2 Drawing Sheets

(56) References Cited

U.S. PATENT DOCUMENTS

| | | | | |
|---|---|---|---|---|
| 8,303,221 | B2 * | 11/2012 | Lenz | B60P 7/0815 |
| | | | | 410/121 |
| 8,408,626 | B1 | 4/2013 | Herdon | |
| 9,139,138 | B2 * | 9/2015 | Fisher | B62D 33/0207 |
| 9,145,177 | B2 * | 9/2015 | Smith | B62D 35/007 |
| 9,796,267 | B1 * | 10/2017 | Ruth | B60K 35/22 |
| 9,908,661 | B1 * | 3/2018 | Homer | B65D 19/38 |
| 10,011,213 | B1 * | 7/2018 | Palmer | G07C 5/0808 |
| 10,577,031 | B2 * | 3/2020 | Crawford | B62D 33/02 |
| 10,583,962 | B2 | 3/2020 | Brunner et al. | |
| 10,703,534 | B2 | 7/2020 | Brunner et al. | |
| D895,966 | S | 9/2020 | Brunner et al. | |
| D895,967 | S | 9/2020 | Brunner et al. | |
| D896,517 | S | 9/2020 | Brunner et al. | |
| D896,518 | S | 9/2020 | Brunner et al. | |
| D897,103 | S | 9/2020 | Brunner et al. | |
| D898,320 | S | 10/2020 | Brunner et al. | |
| 10,829,059 | B1 * | 11/2020 | Addison | B60P 1/433 |
| 10,962,218 | B2 | 3/2021 | Plato et al. | |
| 10,981,696 | B2 | 4/2021 | Brunner et al. | |
| D917,977 | S | 5/2021 | Brunner et al. | |
| D918,584 | S | 5/2021 | Brunner et al. | |
| D919,296 | S | 5/2021 | Brunner et al. | |
| 11,008,136 | B2 | 5/2021 | Brunner et al. | |
| D920,671 | S | 6/2021 | Brunner et al. | |
| 11,027,883 | B1 | 6/2021 | Brunner et al. | |
| D923,935 | S | 7/2021 | Brunner et al. | |
| 11,124,247 | B2 * | 9/2021 | Sosnowich | B62D 33/0207 |
| 11,192,690 | B1 | 12/2021 | Brunner et al. | |
| 11,268,691 | B2 | 3/2022 | Plato et al. | |
| 11,365,026 | B2 | 6/2022 | Brunner et al. | |
| 11,427,382 | B2 | 8/2022 | Brunner et al. | |
| 11,465,805 | B2 | 10/2022 | Brunner et al. | |
| 11,912,347 | B2 * | 2/2024 | Logsdon | B62D 35/001 |
| 12,202,310 | B2 * | 1/2025 | Dudar | B60G 17/01908 |
| 2006/0097021 | A1 * | 5/2006 | Stanton | B60R 5/04 |
| | | | | 224/404 |
| 2013/0297154 | A1 * | 11/2013 | Burchett | B62D 53/0814 |
| | | | | 280/438.1 |
| 2018/0319443 | A1 * | 11/2018 | Morrison | F15D 1/10 |
| 2018/0370450 | A1 * | 12/2018 | Slocombe | B60P 7/12 |
| 2019/0283813 | A1 * | 9/2019 | Smith | B62D 35/001 |
| 2020/0102024 | A1 | 4/2020 | Crandall et al. | |
| 2021/0078529 | A1 * | 3/2021 | Sung | B60R 21/01534 |
| 2022/0111798 | A1 | 4/2022 | Neely, III | |
| 2023/0024026 | A1 * | 1/2023 | Gill | B60R 9/065 |
| 2024/0253580 | A1 * | 8/2024 | Krumholz | B60R 13/01 |

FOREIGN PATENT DOCUMENTS

| | | | | |
|---|---|---|---|---|
| WO | 0174651 | A1 | 10/2001 | |
| WO | WO-2018129192 | A2 * | 7/2018 | B60G 17/0152 |

* cited by examiner

CARGO ORIENTATION AND ALIGNMENT

TECHNICAL FIELD

This disclosure relates generally to a base plate that is used to secure accessories to a vehicle, and which includes a system to optimize cargo orientation and alignment on the base plate to make aerodynamics of the vehicle more efficient while driving.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. When travelling long distances and/or at highway speeds, accessories can change aerodynamic flow around the vehicle.

SUMMARY

In some aspects, the techniques described herein relate to an adjustment system, including: at least one base plate; at least one accessory supported by the at least one base plate; and a controller that receives input from at least one sensor, wherein the controller determines a position of the at least one accessory on the at least one base plate and makes a recommendation to adjust a position of the at least one accessory within a vehicle cargo area to increase aerodynamic efficiency.

In some aspects, the techniques described herein relate to a system, wherein the recommendation is made if vehicle speed exceeds a predetermined speed and/or if distance of travel exceeds a predetermined length.

In some aspects, the techniques described herein relate to a system, wherein the at least one sensor includes at least one camera, at least one radar sensor, and/or at least one sonar sensor.

In some aspects, the techniques described herein relate to a system including at least one wireless communication interface between the at least one accessory and the controller to communicate if the at least one accessory is attached to the base plate and/or if the at least one accessory is being charged by a vehicle power source.

In some aspects, the techniques described herein relate to a system including: a track assembly mounted within the vehicle cargo area and providing at least a first tier track and a second tier track; wherein the at least one base plate has opposing edges supported by the track assembly, wherein a height of the at least one base plate within the vehicle cargo area is varied by switching the at least one base plate between the first tier track and the second tier track; and wherein the controller uses data from the at least one sensor to estimate a size of the at least one accessory, to determine a size and location of empty space within the vehicle cargo area, and to determine a level of the at least one base plate within the vehicle cargo area.

In some aspects, the techniques described herein relate to a system, wherein travel information is communicated to the controller to determine a future vehicle route, wherein the travel information determined from at least one of a route guidance system, a user schedule, or a user smart device to determine a maximum speed and an overall distance of the future vehicle route, and wherein the recommendation is made if the maximum speed exceeds a predetermined speed and/or if the overall distance exceeds a predetermined length.

In some aspects, the techniques described herein relate to a system, wherein the controller uses data from the at least one sensor to determine whether the at least one accessory is level relative to a ground surface within the vehicle cargo area, and/or to determine if the at least one accessory is connected to the base plate.

In some aspects, the techniques described herein relate to a system, wherein the controller uses data from the at least one sensor to determine if the at least one accessory is higher than a specified level within the vehicle cargo area and makes the recommendation to lower the at least one base plate if the specified level is exceeded.

In some aspects, the techniques described herein relate to a system, wherein the controller uses data from the at least one sensor to determine if empty space is available toward a middle portion of the vehicle cargo area and makes the recommendation to move the at least one accessory to the middle portion if the empty space is large enough to accommodate the at least one accessory.

In some aspects, the techniques described herein relate to a system, wherein the at least one accessory comprises a plurality of accessories with one or more accessories stacked on top of each other, and wherein the controller uses data from the at least one sensor to determine if unstacking accessories will increase aerodynamic efficiency and makes the recommendation of which accessories to unstack.

In some aspects, the techniques described herein relate to a system, wherein the controller uses data from the at least one sensor to determine if aerodynamic efficiency is increased by removing the at least one accessory from a load surface of the at least one base plate and storing the at least one accessory in an open area underneath the at least one base plate, and wherein the controller makes the recommendation if aerodynamic efficiency is increased by moving the at least one accessory to the open area.

In some aspects, the techniques described herein relate to a method including the steps of: providing at least one base plate; supporting at least one accessory on the at least one base plate; determining a position of the at least one accessory on the at least one base plate via data from at least one sensor; and determining if aerodynamic efficiency can be increased by adjusting a position of the at least one accessory within a vehicle cargo area and communicating a recommendation to an output device to adjust a position of the at least one accessory within the vehicle cargo area if aerodynamic efficiency can be increased.

In some aspects, the techniques described herein relate to a method, wherein the at least one sensor includes at least one camera, at least one radar sensor, and/or at least one sonar sensor.

In some aspects, the techniques described herein relate to a method including the steps of: wirelessly communicating between the at least one accessory and a controller to determine if the at least one accessory is attached to the base plate and/or to determine if the at least one accessory is being charged by a vehicle power source.

In some aspects, the techniques described herein relate to a method including the steps of: providing a track assembly mounted within the vehicle cargo area that includes at least a first tier track and a second tier track; supporting at least one base plate on the track assembly; varying a height of the at least one base plate within the vehicle cargo area by switching the at least one base plate between the first tier track and the second tier track; and using data from the at least one sensor to estimate a size of the at least one accessory, determine a size and location of empty space within the vehicle cargo area, and determine a level of the at least one base plate within the vehicle cargo area.

In some aspects, the techniques described herein relate to a method including the steps of: communicating travel information to the controller to determine a future vehicle route, wherein the travel information determined from at least one of a route guidance system, a user schedule, or a user smart device to determine a maximum speed and an overall distance of the future vehicle route, and including making the recommendation to adjust a position of the at least one accessory if the maximum speed exceeds a pre-determined speed and/or if the overall distance exceeds a predetermined length.

In some aspects, the techniques described herein relate to a method including the steps of: using the data from the at least one sensor to determine whether the at least one accessory is level relative to a ground surface within the vehicle cargo area, and/or to determine if the at least one accessory is connected to the base plate.

In some aspects, the techniques described herein relate to a method including the steps of: including using the data from the at least one sensor to determine if the at least one accessory is higher than a specified level within the vehicle cargo area and making the recommendation to lower the at least one base plate if the specified level is exceeded.

In some aspects, the techniques described herein relate to a method including the steps of: including using the data from the at least one sensor to determine if empty space is available toward a middle portion of the vehicle cargo area and making the recommendation to move the at least one accessory to the middle portion if the empty space is large enough to accommodate the at least one accessory.

In some aspects, the techniques described herein relate to a method, wherein the at least one accessory comprises a plurality of accessories with one or more accessories stacked on top of each other, and the method includes using the data from the at least one sensor to determine if unstacking accessories will increase aerodynamic efficiency and mak-ing the recommendation of which accessories to unstack, and/or using the data from the at least one sensor to determine if aerodynamic efficiency is increased by remov-ing one or more of the plurality of accessories from a load surface of the at least one base plate and storing the at least one accessory in an open area underneath the at least one base plate, and including making the recommendation if aerodynamic efficiency is increased by moving the at least one accessory to the open area.

The embodiments, examples and alternatives of the pre-ceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an adjustable mounting system for a base plate that is positioned within a vehicle cargo area. The system includes a base plate that provides an attachment interface for securing accessories to the vehicle. The system allows a height of the base plate within the vehicle cargo area to be selectively adjusted. Various types of accessories can be secured to the vehicle through the attachment inter-face provided by the base plate. The number and positions of base plates can be adjusted for particular vehicles or particular needs. The disclosure also provides for a system and method that analyzes accessory locations/heights for aerodynamic efficiency and recommends position adjust-ment if long distance/high speed travel is anticipated. This provides maximum range for the vehicle.

There are often situations where it would be useful for the vehicle owner to be able to switch between different upfit systems to enable different functional capabilities, or to temporarily remove a base plate or an upfit accessory to allow the module or its contents to be used off the vehicle, then reattach the base plate and/or module once the desired operation or task is completed. Traditional upfit integration of elements into a vehicle by mechanical, bolt-on physical attachment makes it difficult to easily change different types of base plates or accessories for use in different applications. The subject disclosure provides an adjustable base plate system and method of adjustment that provides a quick connect/disconnect capability to allow for adjustability of a location of the base plate within the vehicle cargo area and adjustability of accessories on the base plate to optimize aerodynamics.

Figure 1:
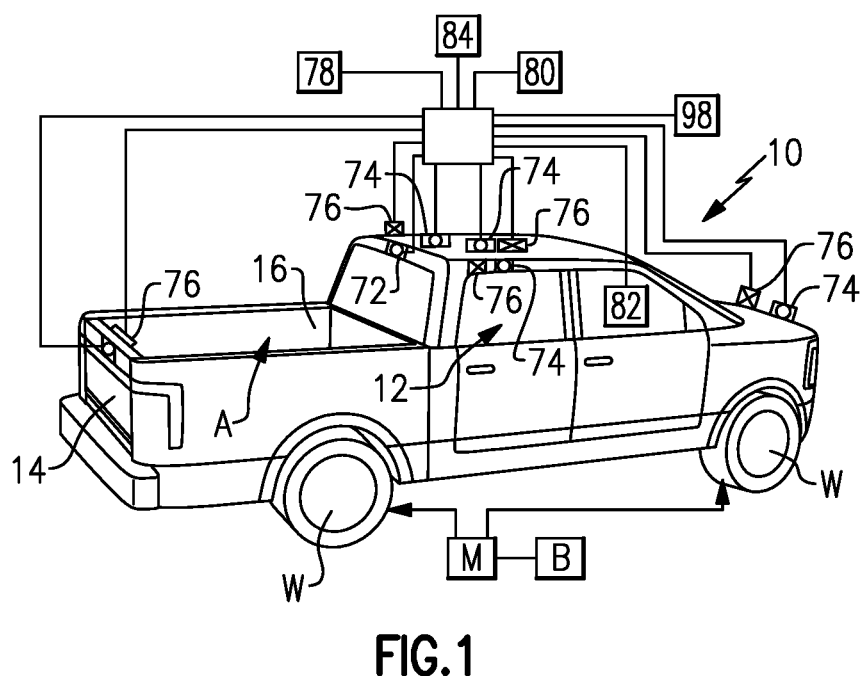
FIG. 1 illustrates a perspective view of a vehicle having a cargo bed that can be equipped with base plates used to secure accessories according to an exemplary aspect of the present disclosure.
Figure 2:
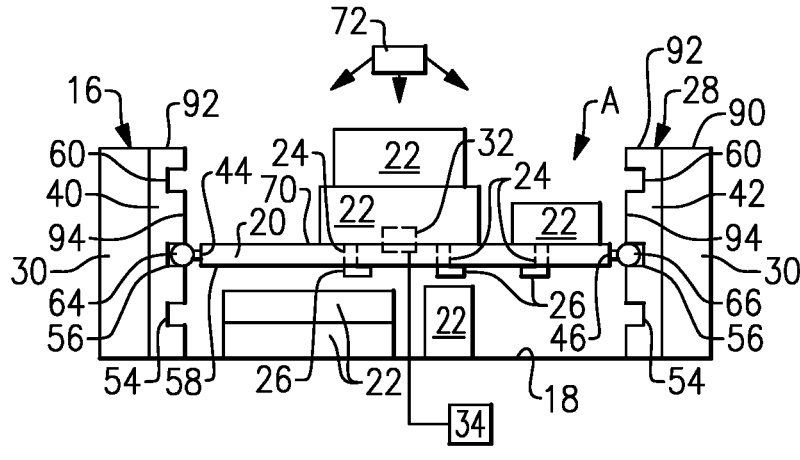
FIG. 2 is a schematic representation of a track system used to adjust a height of a base plate within a cargo area.

FIGS. 1-3E disclose exemplary embodiments of the adjustable base plate system that interfaces with a track assembly within a vehicle cargo area. With reference to FIGS. 1 and 2, a vehicle 10 includes a passenger compart-ment 12 and a tailgate 14 that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electri-fied powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

At least one base plate 20 is positioned within the cargo bed 16. Various accessories and/or modules 22 can be secured to the vehicle 10 by engaging one or more of the base plates 20. The accessories/modules 22 can comprise a lockable storage box that holds tools, a refrigerator, etc. The accessory 22 could also be a lidded lockable container that includes a compartment for storing power tools or other items that require power or data connection.

The accessories 22 can engage one or more of the base plates 20 using an attachment system. In the exemplary embodiment, the attachment system includes a plurality of apertures 24 and at least one foot 26 that cooperate to provide a mechanical connection interface. The base plate 20 is supported relative to the vehicle surface 18 of the cargo area A with an additional support interface that is separate from the mechanical connection interface for the accessories 22. In one example, the additional support interface comprises a track assembly 28 that is positioned to extend along side walls 30 of the cargo bed 16.

In one example, the base plates 20 provide the apertures 24 and the accessories 22 include the plurality of feet 26. This could be rearranged, however, such that one or all of the feet 26 extend from the base plates 20 and the accessories 22 provide some or all of the apertures 24.

In the exemplary embodiment, when the base plate 20 and the accessories 22 are engaged, the feet 26 are each received within one of the apertures 24 such that the feet 26 each extend from a first side of the base plate 20, through one of the apertures 24, and past an opposite, second side of the base plate 20.

In one example, the accessory 22 comprises a lockable box that is mechanically coupled to the vehicle 10 through the base plate 20. Optionally, the accessory 22 could additionally comprise a lockable box that includes a power interface 32. This would allow devices within the lockable box to be powered from a vehicle power supply 34 such as the battery pack B, for example. The internal device could be a refrigerated container that is powered by the vehicle 10 when the box is engaged with the base plate 20, or the devices within the lockable box could comprise rechargeable tools, which can be recharged when set within the box and coupled to a charging interface between the accessory 22 and the base plate 20. In one example, the base plate 20 can be plugged into either 12V vehicle power or other power sources via a variety of connections/outlets.

In the subject disclosure, a track assembly 28 is used to mount one or more base plates 20 within the cargo area A. In one example, the track assembly 28 comprises a first track structure 40 configured to extend along one side of the vehicle cargo area A and a second track structure 42 configured to extend along an opposite side of the vehicle cargo area A. The base plate 20 has a first edge 44 and a second edge 46 opposite of the first edge 44. The first edge 44 is supported by the first track structure 40 and the second edge 46 is supported by the second track structure 42. In one example, the first 44 and second 46 edges extend in a longitudinal direction along a length of the vehicle 10.

Figures 3A, 3B, 3C, 3D, 3E:
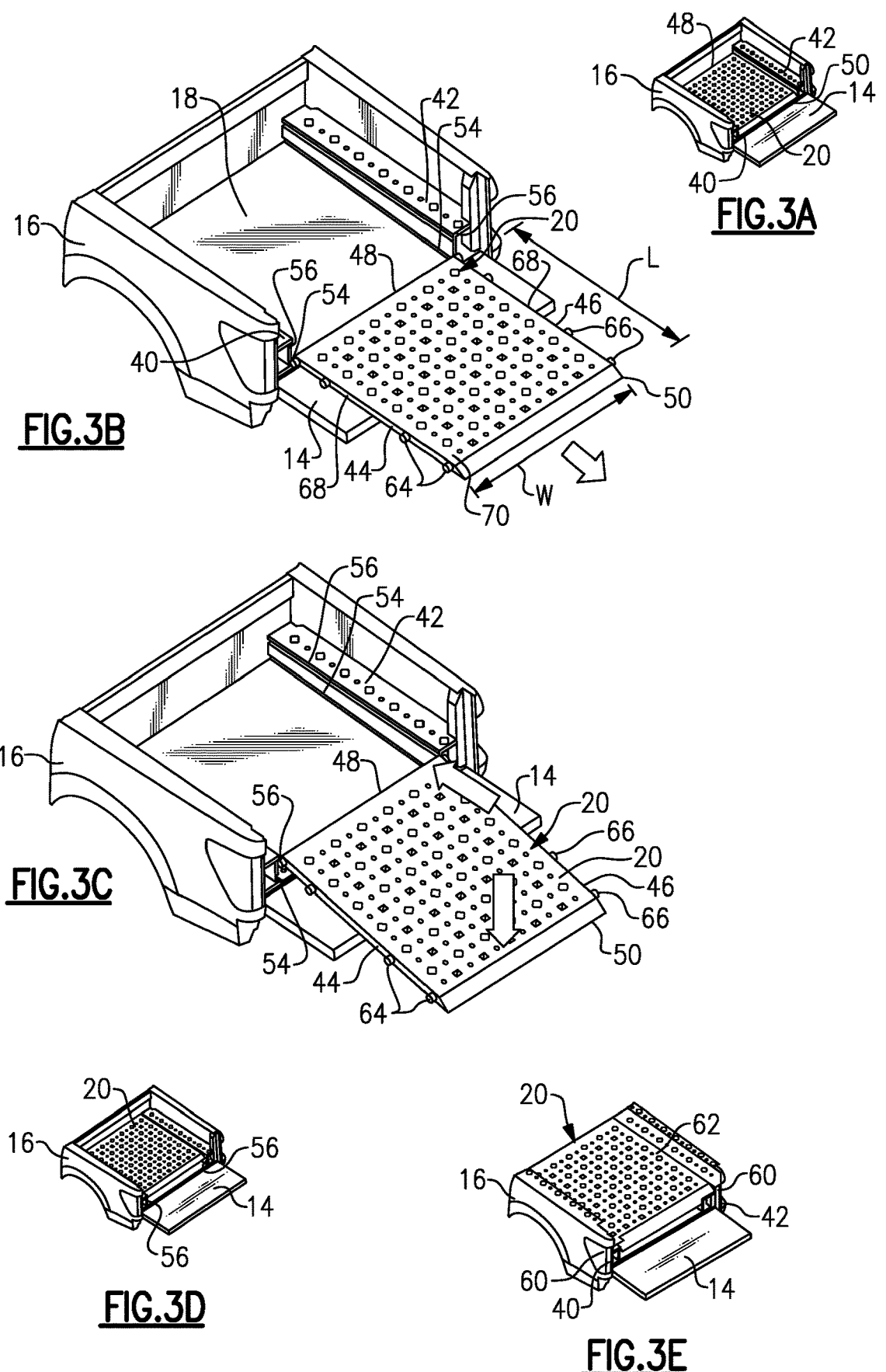
FIG. 3A is a perspective view of an adjustable base plate mounting system with the baseplate in a fully installed position on a lower tier of the track.
FIG. 3B is a view similar to FIG. 3A but with the baseplate in the a fully extended position.
FIG. 3C is a view similar to FIG. 3A but shows the baseplate pivoting from the lower tier of the track to an upper tier of the track.
FIG. 3D is a view similar to FIG. 3A but shows the base plate fully installed on an upper tier of the track.
FIG. 3E is a perspective view with the base plate installed on an additional upper tier such that the base plate can be used as a cover for the cargo bed.

As shown in FIG. 2 the first 44 and second 46 edges are parallel to each other. The base plate 20 also has a third edge 48 and a fourth edge 50 that are parallel and spaced apart from each other (FIG. 3B). The third 48 and fourth 50 edges connect to the first 44 and second 46 edges such that the base plate 20 comprises a four-sided generally flat and planar mount surface to support the accessories 22.

The subject disclosure provides that the first 40 and second 42 track structures allow the base plate 20 to be mounted at different vertical height levels within the cargo area A. In one example, the first track structure 40 and the second track structure 42 each comprise at least a first tier track 54 and a second tier track 56. In one example, the second tier tracks 56 are spaced apart from respective first tier tracks 54 in a vertical direction V relative to the support surface 18 of the vehicle cargo area A. The base plate 20 can be supported by either the first tier tracks 54 or by the second tier tracks 56 such that a distance between a bottom surface 58 of the base plate 20 and the support surface 18 of the vehicle cargo area A can be adjusted.

Additional tiers could be added as needed such that the distances between the bottom surface 58 of the base plate 20 and the support surface 18 of the vehicle cargo area A can be further varied. Optionally, two or more base plates 20 could be installed at the same time to provide support for a plurality of accessories 22, or to provide a support for accessories 22 within the cargo bed 16 in combination with a cover for the cargo bed 16. FIG. 2 shows at least an additional third tier track 60 that is provided on each of the first track structure 40 and the second track structure 42. The third tier track 60 is spaced apart from the first 54 and second 56 tier tracks in the vertical direction V. In one example, when the base plate 20 is installed on the third tier track 60, the base plate serves as a tonneau cover 62 (FIG. 3E) that encloses the vehicle cargo area A.

By installing the base plate 20 on the second tier track 56, the base plate 20 is vertically higher than when the base plate 20 is supported by the first tier track 54. This increases the available cargo area between the bottom surface 58 of the base plate 20 and the support surface 18 of the cargo area A. Additionally, the support surface 18 is free from any base plate support structures between the first track structure 40 and the second track structure 42 as shown in FIG. 2. This further increases available cargo area and also allows for the base plates to be completely removed from the vehicle such that the support surface 18 can receive large, tall items such as furniture, large boxes, etc.

In one example, the edges 44, 46 of the base plate 20 include low-friction members that allow the base plate 20 to be easily moved along the first 54 and second 56 tier tracks such that the base plate 20 can be switched between the different height levels. In one example, a first set of sliders or rollers 64 are positioned on the first edge 44 of the base plate 20 and a second set of sliders or rollers 66 are positioned on the second edge 46 of the base plate 20.

In one example, the base plate 20 has a width W extending in a lateral direction across a width of the vehicle 10 and a length L extending in a longitudinal direction along a length of the vehicle 10. The first 44 and second 46 edges of the base plate 20 extend in the longitudinal direction and the third 48 and fourth 50 edges of the base plate 20 extend in the lateral direction. The first 44 and second 46 edges of the base plate 20 have edge surfaces 68 that are perpendicular to a cargo support surface 70 of the base plate 20. The first 64 and second 66 sets of rollers are respectively spaced apart from each other in the longitudinal direction along the first 44 and second 46 edges of the base plate 20. In one example, the first 64 and second 66 sets of rollers extend outwardly of the first 44 and second 46 edges of the base plate 20 in the lateral direction. In one example, the rollers comprise axles that are fixed to the base plate edges with roller elements supported on the axles to independently rotate about a respective axis of the axles.

In one example, the first track structure 40 and the second track structure 42 are steel, roll-formed structures that are mounted to side walls 30 of the cargo bed 16 and/or to outermost edge portions of the support surface 18. In one example, the first 40 and second 42 track structures have a cross-section that comprises an upper plate 92 and a side plate 94. The upper plate 92 extends in the lateral direction and the side plate 94 extends in a vertical direction. The first 54, second 56, and third 60 tier tracks are formed within the side plate 94. In one example, the first 54, second 56, and third 60 tier tracks comprise a C-shape or U-shape. The open cross-section of the C-shape or U-shape is open in a direction that faces the cargo area A. As discussed above, the first 64 and second 66 sets of rollers are either positioned on the first tier track 54, the second tier track 56, or on the third tier track to install the base plate 20 in the vehicle cargo area A.

FIG. 3A shows the base plate in a fully installed position on the lower tier track 54. To change the position of the base plate 20, the fourth edge 50, e.g. a rearward edge, of the base plate 20 is moved at least partially outwardly of the vehicle cargo area A via the first 64 and second 66 sets of rollers along the first tier track 54 as shown in FIG. 3B. The base plate 20 is then removed from the first tier track 54 and is installed on the second tier track 56. Optionally, the base plate 20 can be completely removed from the cargo area A as needed.

In one example, the base plate 20 is moved in a rearward direction along the lower tier track 54 such that a rearward end of the base plate 20 extends outwardly of the vehicle cargo area, and then the rearward end of the base plate 20 is pivoted downward to move a forward end 48 of the base plate 20 in an upward direction to the upper tier track 56 as shown in FIG. 3C. Finally, the forward end of the base plate 20 is then moved in a forward direction to install the base plate 20 on the upper tier track 56 as shown in FIG. 3D. FIG. 2 shows how much the cargo area underneath the base plate 20 is increased by moving to the upper tier track 56. FIG. 3E shows the base plate 20 installed on the additional upper tier track 60 to provide the option of a cover 62.

The subject disclosure provides a system and method that analyzes accessory locations and heights within the cargo area A for aerodynamic efficiency purposes and recommends position and height adjustments if long distance or high speed travel is anticipated. This will maximize the range for the vehicle.

In one example, existing vehicle sensors are used to provide information to a system controller C to analyze accessory height and position/location within the cargo area A. Once the system controller C receives the data/information, an aerodynamic analysis is performed and it is determined if any suggestions can be made to the user/driver to adjust accessory location and/or height within the cargo area A. In one example, the sensors include one or more of a center high-mounted stop lamp (CHMSL) camera 72, additional cameras 74, sonar and/or radar sensors 76, and any other vehicle sensors 78, e.g. on-board scales (OBS), etc., to determine position and height of accessories in the cargo area A. Wireless communication via a wireless interface 80 also takes place between accessories 22 attached to the base plate 20 and the controller C to determine if boxes/accessories 22 are actually attached to the base plate 20. Wireless communication can also take place between any of the sensors and the controller.

In one example, the vehicle uses one or more of the sensors 72-78 to scan the base plate 20 for empty space. The controller C also uses one or more of the sensors 72-78 to estimate the size of each accessory 22 and to estimate an available amount of empty space and available attachment point locations on the base plate 20. The controller C will also use one or more of the sensors 72-78 to determine which level the base plate 20 is positioned at within the cargo area A.

In one example, the system controller C communicates with and/or monitors travel information to determine if the vehicle will be travelling to a new location and is configured to make a load adjustment recommendation if necessary. In one example, the travel information is obtained via a route guidance system 82, a user's schedule and/or a user's smart device 84. If the vehicle is expected to see high speeds, e.g. highway speeds of 55 mph or greater for example, or if the vehicle is expected to travel longer distances, e.g. distances greater than a few miles, the vehicle system uses the vehicle sensors to determine whether all accessory attachments are secure. The controller C will then determine if other locations for each accessory 22 would provide more efficient aerodynamic results, and/or if a level of the base plate 20 should be adjusted to provide more efficient aerodynamic results.

In one example, the system uses the sensors to scan each accessory 22 to ensure it is level relative to a ground surface within the cargo area A and that it is connected to the base plate 20. In one example, the system uses artificial intelligence (AI) and/or machine learning (ML) methods. AI provides for the creation of intelligent machines that can simulate human thinking capability and behavior, whereas, machine learning is an application or subset of AI that allows machines to learn from data without being programmed explicitly.

The system is configured to optimize payload in the following manner. In one example, the controller C considers if the base plate 20 can be lowered. For example, if boxes or accessories 22 on the base plate 20 are above a top of the cab or above a top surface 90 (bed line) of the walls 30 of the truck bed 16, the system can recommend that the base plate 20 be lowered to a different level to ensure all boxes/accessories 22 are below the bed line if possible.

In another example, the system considers if boxes and accessories 22 can be grouped in a center portion of the base plate 20 and grouped to extend along a generally linear path in the longitudinal direction at the middle portion. If space is available towards the middle/center of the base plate 20, the controller C will recommend shifting boxes/accessories 22 to the middle to increase the aerodynamic efficiency of the vehicle 10.

In another example, the system considers if boxes/accessories 22 can be unstacked. If boxes/accessories 22 are stacked (FIG. 2), the controller C can recommend to unstack them. The unstacking recommendation would also include a recommendation to then position the boxes/accessories 22 in a manner as described above.

In another example, the system considers if boxes/accessories 22 can be lowered by detaching them from the base plate 20 and storing them underneath the base plate 20 (FIG. 2). If appropriate, the system can suggest to the user to place one or more boxes/accessories underneath the base plate 20 to allow them to be more secure if they do not need to charged or powered by the base plate 20, for example.

In one example, the system is configured to optimize payload in a sequence that first considers if base plate 20 can be lowered. Subsequently, the system will consider whether boxes and accessories 22 can be grouped in a center of the cargo area A and be positioned to extend along a generally linear path in the middle. Subsequently, the system considers if boxes/accessories 22 can be unstacked. Finally, the system considers if aerodynamic efficiency can be increased if boxes/accessories 22 can be detached from the base plate 20 and then stored underneath the base plate 20.

In another example, the system can be configured to suggest that loads be biased to the rear of the cargo area A, and further to suggest the load be levelled in a vertical direction to increase aerodynamic efficiency.

In one example, the controller C is a dedicated control unit, or the controller C can be incorporated as part of an existing controller on the vehicle 10. The controller C can include a processor, memory, and one or more input and/or output (I/O) device interface(s) that are communicatively coupled via a local interface. The local interface can include, for example but not limited to, one or more buses and/or other wired or wireless connections. The local interface may include address, control, and/or data connections to enable appropriate communications among the aforementioned components. The controller C may be a hardware device for executing software, particularly software stored in memory. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. The Input/Output devices that may be coupled to system I/O Interface(s) may include input devices, for example but not limited to, a keyboard, mouse, scanner, microphone, camera, proximity device, smart device, etc. Further, the Input/Output devices may also include output devices, for example but not limited to, a printer, display, smart device, etc. The controller C can be configured to execute software stored within the memory, to communicate data to and from the memory, and to generally control operations of the computing device pursuant to the software.

In the subject disclosure, the controller C is configured to receive data from the various vehicle sensors 72-78, process the data, and analyze the data to recommend and/or suggest payload adjustment options via an output device 98. The output device 98 comprise an audio output, an output to a vehicle screen/display, an output to a smart device, etc. In one example, the controller C determines the various locations of cargo within the cargo bed area A, determines the location of any available empty space, and then determines whether aerodynamic efficiency would be increased by moving one or more of the cargo items to an empty space within the cargo area. The controller C also determines if aerodynamic efficiency would be increased by unstacking boxes/accessories 22 and/or rearranging the boxes/accessories 22 within the cargo area A. The controller C also determines if aerodynamic efficiency would be increased by simply lowering the base plate 20 within the cargo area A. The controller C also determines if aerodynamic efficiency would be increased by raising the base plate 20 and moving the cargo from on top of the base plate 20 to being stored beneath the base plate 20. The controller C is also configured to optimize and prioritize the recommendations as discussed above.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An adjustment system, comprising:
   at least one base plate at a first connection interface with a support structure and including a plurality of mounting apertures, wherein the at least one base plate is selectively slidable relative to the support structure to adjust a position of the at least one base plate;
   at least one accessory supported by the at least one base plate, wherein the at least one accessory includes one or more mounting feet that are selectively engageable within the plurality of mounting apertures to secure the at least one accessory to the at least one base plate via a second connection interface that is different from the first connection interface; and
   a controller that receives input from at least one sensor, wherein the controller determines a position of the at least one accessory on the at least one base plate based on the input from the at least one sensor and makes a recommendation to adjust a position of the at least one accessory within a vehicle cargo area to increase aerodynamic efficiency.

2. The adjustment system of claim 1, wherein the recommendation is made if vehicle speed exceeds a predetermined speed and/or if distance of travel exceeds a predetermined length.

3. The adjustment system of claim 1, wherein the at least one sensor includes at least one camera, at least one radar sensor, and/or at least one sonar sensor.

4. The adjustment system of claim 1, including at least one wireless communication interface between the at least one accessory and the controller to communicate if the at least one accessory is attached to the base plate and/or if the at least one accessory is being charged by a vehicle power source.

5. An adjustment system, comprising:
   at least one base plate;
   at least one accessory supported by the at least one base plate;
   a controller that receives input from at least one sensor, wherein the controller determines a position of the at least one accessory on the at least one base plate and makes a recommendation to adjust a position of the at least one accessory within a vehicle cargo area to increase aerodynamic efficiency;
   a track assembly mounted within the vehicle cargo area and providing at least a first tier track and a second tier track;
   wherein the at least one base plate has opposing edges supported by the track assembly, wherein a height of the at least one base plate within the vehicle cargo area is varied by switching the at least one base plate between the first tier track and the second tier track; and
   wherein the controller uses data from the at least one sensor to estimate a size of the at least one accessory, to determine a size and location of empty space within the vehicle cargo area, and to determine a level of the at least one base plate within the vehicle cargo area.

6. The adjustment system of claim 5, wherein travel information is communicated to the controller to determine a future vehicle route, wherein the travel information determined from at least one of a route guidance system, a user schedule, or a user smart device to determine a maximum speed and an overall distance of the future vehicle route, and wherein the recommendation is made if the maximum speed exceeds a predetermined speed and/or if the overall distance exceeds a predetermined length.

7. The adjustment system of claim 6, wherein the controller uses data from the at least one sensor to determine whether the at least one accessory is level within the vehicle cargo area, and/or to determine if the at least one accessory is connected to the base plate.

8. The adjustment system of claim 6, wherein the controller uses data from the at least one sensor to determine if the at least one accessory is higher than a specified level within the vehicle cargo area and makes the recommendation to lower the at least one base plate if the specified level is exceeded.

9. The adjustment system of claim 6, wherein the controller uses data from the at least one sensor to determine if empty space is available toward a middle portion of the vehicle cargo area and makes the recommendation to move the at least one accessory to the middle portion if the empty space is large enough to accommodate the at least one accessory.

10. The adjustment system of claim 6, wherein the at least one accessory comprises a plurality of accessories with one or more accessories stacked on top of each other, and wherein the controller uses data from the at least one sensor to determine if unstacking accessories will increase aerodynamic efficiency and makes the recommendation of which accessories to unstack.

11. The adjustment system of claim 6, wherein the controller uses data from the at least one sensor to determine if aerodynamic efficiency is increased by removing the at least one accessory from a load surface of the at least one base plate and storing the at least one accessory in an open area underneath the at least one base plate, and wherein the controller makes the recommendation if aerodynamic efficiency is increased by moving the at least one accessory to the open area.

12. The adjustment system of claim 1, wherein the controller uses data from the at least one sensor to determine whether the at least one accessory is level in relation to a ground surface within a vehicle cargo area associated with the at least one base plate.

13. The adjustment system of claim 1, wherein the controller uses data from the at least one sensor to determine if the at least one accessory is connected to the at least one base plate.

14. The adjustment system of claim 1, wherein the controller uses data from the at least one sensor to determine a height of the at least one accessory in a vehicle cargo area associated with the at least one base plate.

15. The adjustment system of claim 1, wherein the at least one sensor scans the at least one base plate to identify empty space.

16. The adjustment system of claim 1, wherein the controller uses data from the at least one sensor to estimate a size of each accessory.

17. The adjustment system of claim 1, wherein the controller uses data from the at least one sensor to determine available attachment point locations on the at least one base plate for the at least one accessory.

18. The adjustment system of claim 1, wherein the first connection interface comprises a sliding connection interface between a track assembly on the support structure and one or more sliders associated with the at least one base plate, and wherein the plurality of mounting apertures extend through a thickness of the at least one base plate from one surface that supports the at least one accessory to an opposite surface, and wherein the accessory is supported on the one surface of the at least one base plate and the one or more mounting feet extend through the plurality of mounting apertures to engage the opposite surface of the at least one base plate to provide the second connection interface.

19. The adjustment system of claim 1, wherein the at least one accessory comprises a plurality of accessories, and wherein the controller uses data from the at least one sensor to determine if any accessory is higher than a specified level within a vehicle cargo area associated with the at least one base plate, and in an accordance with a determination that the specified level is exceeded, the controller makes a recommendation to:

lower the at least one base plate; and/or rearrange the plurality of accessories such that the plurality of accessories are lower than the specified level.

20. The adjustment system of claim 1, wherein the at least one accessory comprises a plurality of accessories, and wherein the controller:

uses data from the at least one sensor to determine a current position of each accessory;

receives travel route information for a vehicle associated with the at least one base plate;

determines vehicle speeds and travel distances along a specified travel route based on the travel route information;

determines aerodynamic efficiency of the plurality of accessories in the current position;

in accordance with a determination that vehicle speeds exceed a predetermined limit and/or travel distances exceed a predetermined distance, determines whether the aerodynamic efficiency of the plurality of accessories can be increased in response to a change in position; and makes a position change recommendation in response to a determination that aerodynamic efficiency can be increased.

* * * * *